Ellis & Ellis.

Brick Mold

N° 87,830. Patented Mar. 16, 1869.

Witnesses
J. Shaw
Wm Jas Burns.

Inventors.
Thomas Ellis.
William A. Ellis.

Ellis & Ellis.
Brick Mold.
N° 87,830. Patented Mar. 16, 1869.

UNITED STATES PATENT OFFICE.

THOMAS ELLIS AND WILLIAM A. ELLIS, OF PHILADELPHIA, PENNSYLVANIA.

Letters Patent No. 87,830, dated March 16, 1869.

IMPROVEMENT IN BRICK-MOULDS.

The Schedule referred to in these Letters Patent and making part of the same.

*To all whom it may concern:*

Be it known that we, THOMAS ELLIS and WILLIAM A. ELLIS, both of Philadelphia, Pennsylvania, have invented a new and useful Improvement in Brick-Moulds; and we do hereby declare that the following is a full and exact description of the same, reference being had to the annexed drawings, forming part hereof, and to the letters of reference marked thereon, in which drawings—

Figure 1:
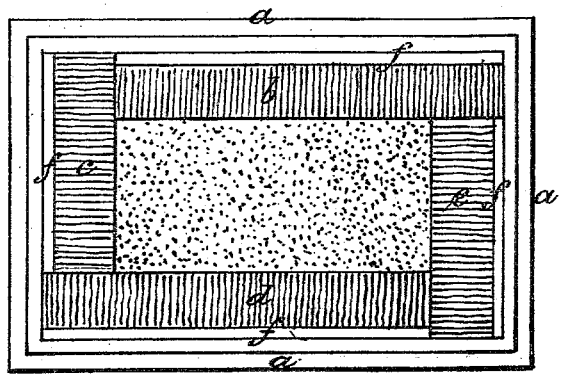

Figure 1 is a top view of the mould with the plunger removed.

Figure 2:
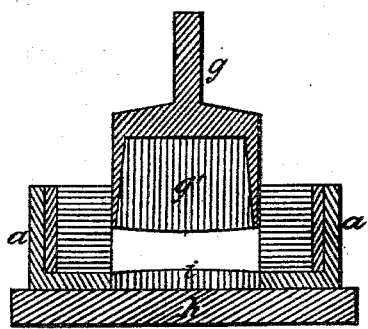

Figure 2, a vertical cross-section of the mould and plunger.

Figure 3:
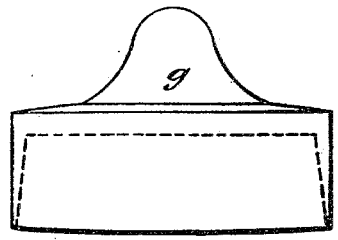

Figure 3, a side view of the plunger.

Figure 4:
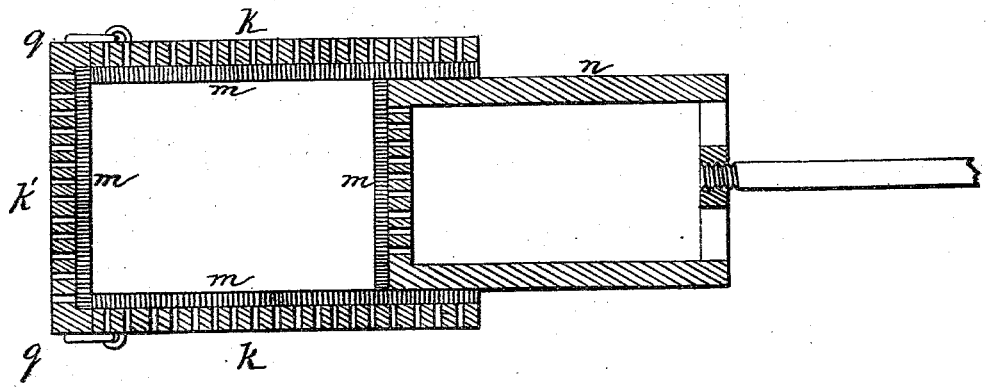
Figure 5:
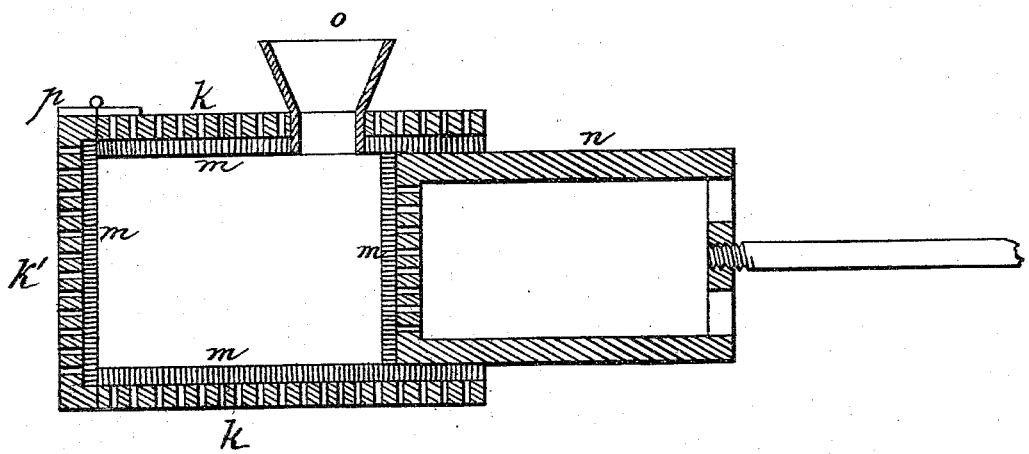

Figures 4 and 5 represent horizontal and longitudinal vertical sections, respectively, of a modified form of our said mould and plunger.

$a$, figs. 1 and 2, is a case, of cast-iron, steel, or other metal, of sufficient strength to resist the pressure ordinarily exerted in the formation of a brick by machinery.

$b\ c\ d\ e$, which constitute the side lining of the case $a$, are blocks of white pine, oak, ash, or other porous wood, cut directly or diagonally across the grain, and presenting the pores of the wood to the brick-space of the mould, as shown.

$f$ is a cement, of brimstone, or other suitable substance or substances, for fastening the blocks $b\ c\ d\ e$ in the case $a$.

$g$ is the plunger, which consists of a case, of cast-iron, or other suitable material, faced with or enclosing a block of porous wood, cut directly or diagonally across the grain, and applied so that the pores of the wood are presented endwise to the brick-space of the mould, as shown in fig. 2.

$h$, fig. 2, is the mould-bottom, which is of cast-iron, or other suitable material, to which is secured a block of porous wood, $i$, cut directly or diagonally across the grain.

In actual use, we employ, instead of the bottom, $h$, with its wood, $i$, another plunger, similar to the plunger $g$.

Instead of employing a metallic case, $a$, this may be dispensed with, if desired, the wooden blocks being made of sufficient thickness, or length, to resist the pressure above mentioned, and, at the same time, to secure the desired result, viz, the inadhesion of the clay to the wood.

In this case the separate blocks are fastened together with screws, or in any other suitable manner desired.

In order to obviate the sticking of the clay, the plunger or plungers, or the bottom of any brick-mould, may be faced with or formed of wood, arranged so that the pores (or grain) thereof are presented to the clay in the mould.

In fact, in any situation where wood is to come in contact with clay, in the formation of bricks, if the wood is arranged as we have above described, the tendency of the brick or clay to adhere to the wood is much diminished.

The mould and plunger, having a lining, or facing of wood, with the grain presented endwise toward the interior of the mould, are applicable, with great advantage, not only in machines for making bricks, of clay, or other material, for building-purposes, but also in machines for the compression of peat into bricks, or blocks, in machines for expressing moisture from the materials used in the manufacture of whiting, and generally where moisture is to be separated from solid substances with which it is mixed.

When such mould and plunger are used for the purposes last mentioned, the wood lining, or facing, provides for the escape, through the pores of the wood, of the moisture expressed, and in such case the covering at the back of the wood should be such as to provide for the egress of the moisture expressed.

Figs. 4 and 5 are intended to represent our mould and plunger as modified, to adapt it to the purposes last mentioned.

Referring to these figures, $k$ represents the metallic casing of the mould, which is perforated, as shown, and faced with wood, $m$, which is cut across the grain, as described, and fastened to the casing $k$ with screws.

$n$ is the plunger, which is hollow, its front end being perforated, as shown, and faced with wood, $m$, cut across the grain, as described, and fastened to the face of the plunger with screws.

$o$ is the hopper, placed on top of the mould, for the introduction of the moist substances to be compressed.

The front side, or end, $k'$, of the mould, should be capable of being moved out of the way, to allow the compressed substances to be taken from the mould, or pushed out of it by the plunger. This end, $k'$, is therefore attached to the body of the mould by a hinge, $p$, and when closed, is fastened with catches $q$.

The water expressed through the wooden linings of the sides of the mould, escapes through the perforations in the metallic casing $k$, and the water expressed through the wooden facing of the plunger, escapes through the perforations in the front end of the plunger, and runs off at the rear, through the open end thereof.

We prefer, for brick-making, that the mould should be formed of or faced with porous wood, arranged so that its end grain is presented to the clay, substantially as described, but the mould, in such case, may be formed wholly of iron, or other material, and good results still be obtained, provided the plungers are formed of or faced with the wood cut across the grain, as already described.

It is obviously immaterial whether the mould, or box, intended to contain the material to be compressed, is of the shape of a brick, or of other regular form.

Having thus described our invention,

We claim, and desire to secure by Letters Patent—

The plunger, formed of or faced with porous wood, presenting its end grain to the material to be compressed, and either with or without a partial or entire perforated or imperforated back, or casing of metal, in combination with a mould, or box, wholly or partially formed of or faced with porous wood, presenting its end grain to the material to be compressed, whether such wood is or is not backed with a casing of metal, and whether such casing is or is not perforated or imperforated, substantially as set forth.

THOMAS ELLIS.
WILLIAM A. ELLIS.

Witnesses:
J. SHAW,
WM. JAS. BURNS.